US005376807A

United States Patent [19]

Liu et al.

[11] Patent Number: 5,376,807

[45] Date of Patent: Dec. 27, 1994

[54] MOTION-SENSITIVE OPTICAL CORRELATOR USING A VANDERLUGT CORRELATOR

[75] Inventors: Tsuen-Hsi Liu, Northridge; Tien-Hsin Chao, Valencia; Li-Jen Cheng, La Crescenta, all of Calif.

[73] Assignee: The United States of America as represented by the Administrator of the National Aeronautics and Space Administration, Washington, D.C.

[21] Appl. No.: 46,331

[22] Filed: Apr. 7, 1993

[51] Int. Cl.[5] ..................... G06F 15/336; G06K 9/64

[52] U.S. Cl. ..................... 250/561; 359/561; 382/42

[58] Field of Search ..................... 250/561, 208.1; 348/155, 161; 359/559, 561; 382/31, 42

[56] References Cited

U.S. PATENT DOCUMENTS

| | | | |
|---|---|---|---|
| 3,665,097 | 5/1972 | Macovski | 359/561 |
| 4,773,719 | 9/1988 | Anderson et al. | 350/3.64 |
| 4,948,212 | 8/1990 | Cheng et al. | 350/3.64 |
| 4,968,107 | 11/1990 | Yeh | 350/3.64 |
| 5,005,927 | 4/1991 | Cudney et al. | 350/3.64 |
| 5,018,852 | 5/1991 | Cheng et al. | 356/28.5 |
| 5,029,220 | 7/1991 | Juday | 382/6 |
| 5,050,967 | 9/1991 | Hong | 359/285 |
| 5,072,314 | 12/1991 | Chang | 359/559 |
| 5,086,483 | 2/1992 | Capps | 250/208.1 |
| 5,107,351 | 4/1992 | Leib et al. | 359/11 |
| 5,121,248 | 6/1992 | Mohon et al. | 359/306 |
| 5,138,489 | 8/1992 | Paek | 382/42 |
| 5,148,496 | 9/1992 | Anderson | 359/561 |
| 5,150,228 | 9/1992 | Liu et al. | 359/7 |
| 5,150,229 | 9/1992 | Takesue et al. | 359/7 |
| 5,235,461 | 8/1993 | Kirsch et al. | 382/42 |
| 5,311,359 | 5/1994 | Lucas et al. | 359/561 |

*Primary Examiner*—David C. Nelms
*Assistant Examiner*—Stephone B. Allen
*Attorney, Agent, or Firm*—John H. Kusmiss; Thomas H. Jones; Guy M. Miller

[57] ABSTRACT

A new type of optical correlator performs motion detection or background clutter suppression and correlation simultaneously in a single photorefractive crystal, and is useful for moving target identification and tracking and for stationary clutter rejection. The correlation is of the VanderLugt type and the motion detection or background clutter suppression is based on the erasing property of photorefractive crystals.

15 Claims, 2 Drawing Sheets

FIG. 1a
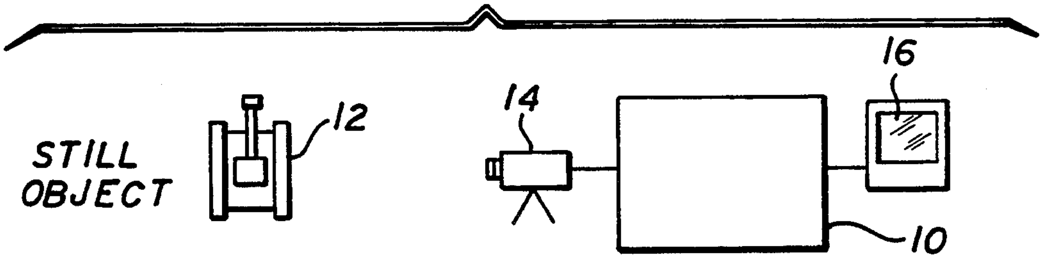
FIG. 1b
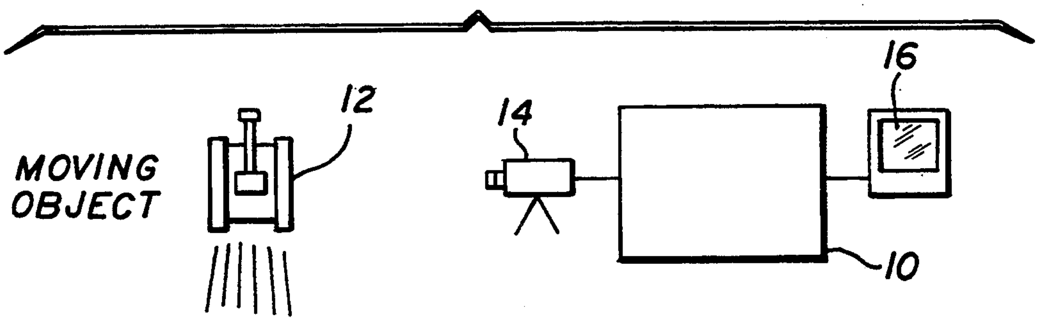
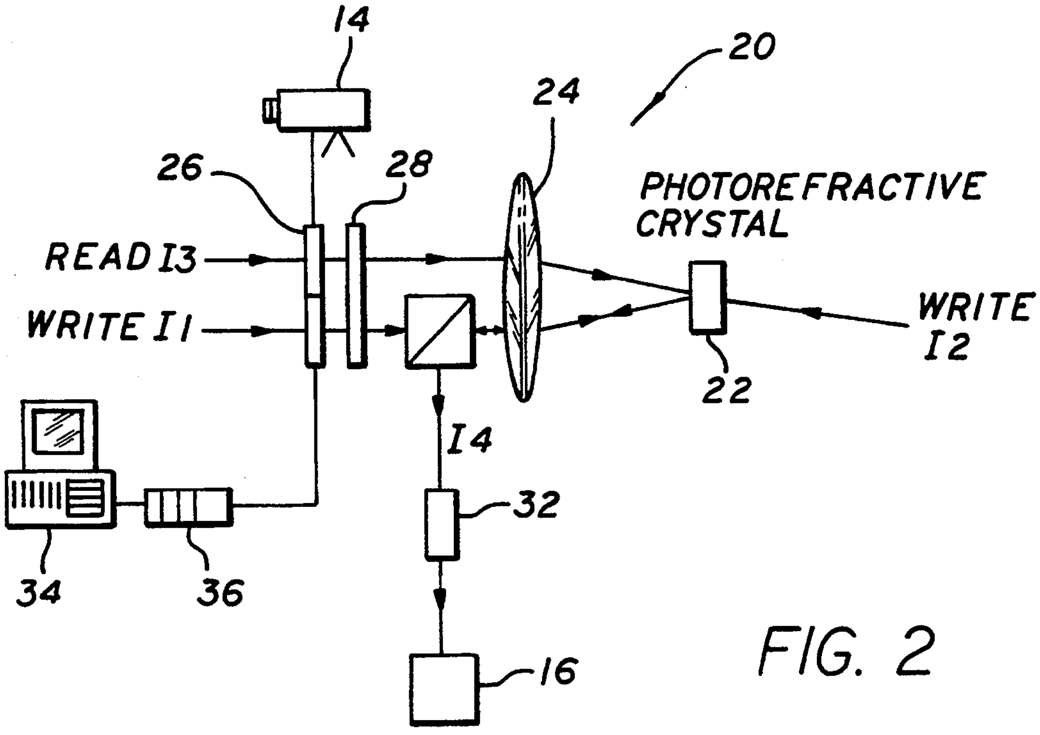
FIG. 2

FIG. 3
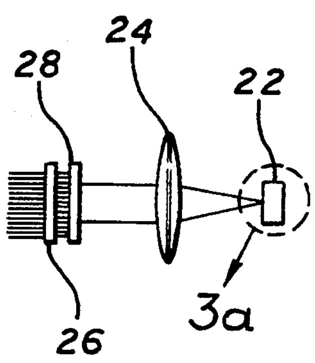
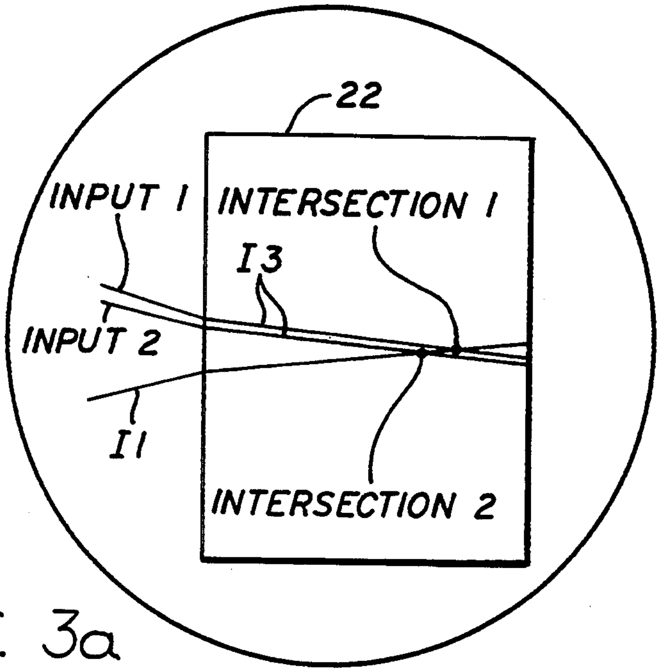
FIG. 3a
FIG. 4
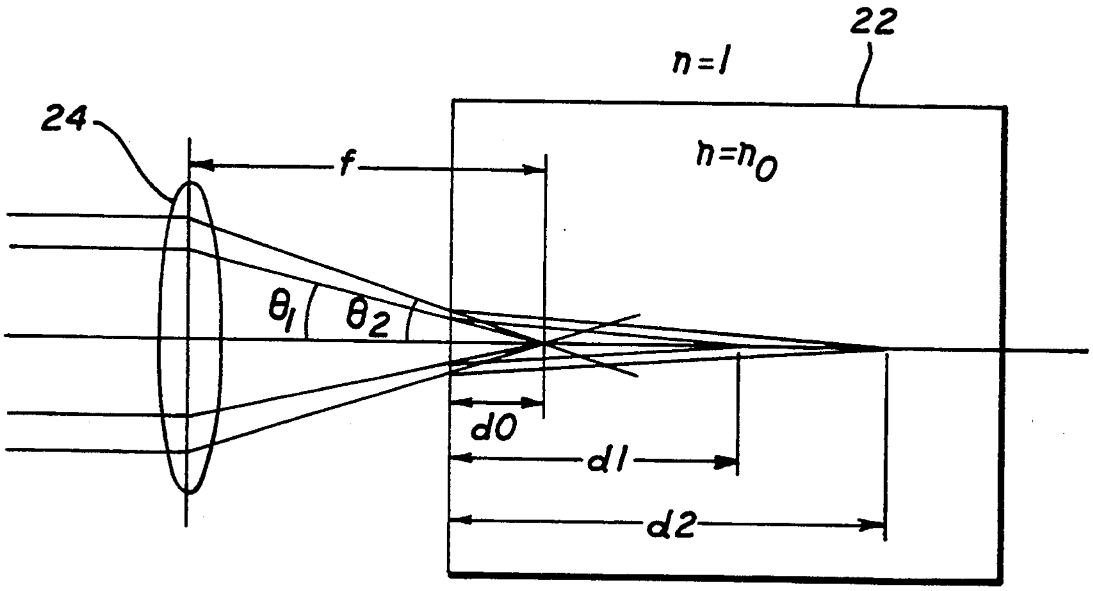

MOTION-SENSITIVE OPTICAL CORRELATOR USING A VANDERLUGT CORRELATOR

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

The invention relates to optical correlators, and, more particularly, to optical correlators employing photorefractive crystals for detection and recognition of moving objects.

BACKGROUND ART

The main advantage of optical correlators, as compared with their digital counterparts, is that high resolution Fourier transform operation on the input optical images may be rapidly executed, typically in nanoseconds, by simply transmitting the input image through a single lens. However, the overall speed of an optical correlator is still limited by how fast the information can be updated on the input devices (e.g., spatial light modulators), the real-time holographic material, and the output device (e.g., camera or detector array). The speeds of these three components are equally important, because the slowest component will determine the overall speed of the system.

Photorefractive crystals have been used as the real-time holographic material. While photorefractive crystals are in general slower than other non-linear optical materials, they can operate with a much lower power requirement. Photorefractive semiconductor materials such as GaAs, InP, and CdTe are generally one to two orders of magnitude faster than photorefractive oxides such as $BaTiO_3$, $(Sr,Ba)NbO_3$ (SBN), and $Bi_{12}SiO_{20}$ (BSO).

In the field of optical correlators, a real-time optical correlator using a photorefractive GaAs crystal and two liquid crystal television (LCTV)-based spatial light modulators has been demonstrated by several investigators. In this correlator, when the shape, size, and orientation of the object in the input image and the object in the reference image are the same, the correlator displays a bright spot (autocorrelation peak) in the output image at an equivalent location of the object in the input image. Therefore, the autocorrelation peak can be used not only to identify an object but also to track its location.

This optical correlator can potentially operate at a frame rate of $>1{,}000$ frames/sec, provided other parts of the system have comparable speeds. The speed bottleneck of the optical correlator is at both the input and the output devices.

Furthermore, because both the input and reference images are automatically edge-enhanced in the correlator, the profile of the autocorrelator peak is sharper and most background caused by the clutters are reduced.

However, while the prior art optical correlators can detect and recognize objects, they cannot distinguish whether the object is stationary or moving. Further, if there is background noise that introduces clutter, the prior art optical correlators cannot easily separate the object from the noise.

Thus, there exists a need for a pattern recognition system with the ability to (1) detect and recognizing moving objects and (2) suppress stationary background or stationary clutter.

STATEMENT OF THE INVENTION

Accordingly, it is an object of the present invention to provide a method for detecting and recognizing moving objects.

It is another object of the present invention to provide a method for suppressing stationary background or stationary clutter.

In accordance with the invention, an optical correlator is provided which performs either motion detection or clutter rejection and correlation simultaneously in a single photorefractive crystal. Further, the optical correlator of the present invention can perform clutter rejection when the object is moving and the clutter is stationary. In the prior art, these two functions (motion detection/clutter rejection and correlation) have been performed by separate systems. The improvement provided by the invention comes in part from using the index-grating erasing property of photorefractive crystals to enable motion detection. Possible uses for this correlator include moving target tracking and stationary clutter rejection.

The method of the invention utilizes a VanderLugt correlator and comprises modulating a read beam and a write beam by means of a spatial light modulator on which is contained a reference image of the object to be detected. The read beam contains the image of the object. Both beams pass through a Fourier transform lens, which generates Fourier transform images of the beams, which then intersect with a second write beam in a fast photorefractive crystal. The intensity of the read beam is maintained at least twice as high as the intensities of the write beams so as to enable detection and recognition of a moving object or suppression of stationary background clutter.

BRIEF DESCRIPTION OF THE DRAWINGS

FIG. 1*a* is a schematic diagram of a stationary object, depicting the functionality of a motion-sensitive optical correlator in accordance with the invention, in which the reference object in the motion-sensitive optical correlator is chosen to be the same as the object captured by the camera;

FIG. 1*b* is a schematic diagram similar to that depicted in FIG. 1*a*, except that the object is moving;

FIG. 2 is a schematic diagram of the motion-sensitive optical correlator of the invention;

FIG. 3 depicts a portion of FIG. 2;

FIG. 3*a* is an enlargement of a portion of FIG. 3, depicting the beam geometry in the photorefractive crystal employed in the apparatus illustrated in FIG. 2; and FIG. 4 is a schematic diagram, depicting the focal points in a refractive medium, with the scale exaggerated for the sake of illustration.

DETAILED DESCRIPTION OF THE INVENTION

A new type of optical correlator, namely, a motion-sensitive optical correlator, is disclosed herein. It performs both motion detection or suppression of stationary background and correlation simultaneously in a single photorefractive crystal. Therefore, it may track a moving target and reject stationary clutters in the scene at the same time.

The basic structure of the motion-sensitive optical correlator is essentially the same as that of a regular real-time photorefractive crystal-based VanderLugt Correlator. However, the beam ratio is adjusted in such a way that the index grating or hologram in the photorefractive crystal is erased by the input scene in read beam when it is stationary. When an object is moving in the input scene, a new part of the index grating, which is not overlapped and erased by the read beam previously, will be overlapped by the read beam at its new orientation and diffract the read beam efficiently for a short time. (It will be noted that the photorefractive crystal has a thickness and the read beam pattern and the write beam pattern only partially overlap each other throughout the whole crystal.) Thus, all the stationary objects such as clutters in input scene will not be diffracted efficiently and thus will be rejected, while all those moving objects that match the reference target will be diffracted efficiently and displayed at the output.

The system has been demonstrated using GaAs and CdTe crystals, which are relatively fast photorefractive crystals with millisecond response times at moderately low laser power density (100 $mW/cm^2$). The input scene and the reference targets were input to the system through a commercial liquid crystal TV panel.

The method of the present invention uses the erasing property of a photorefractive crystal. The basic structure of this system is the same as that of a regular real-time photorefractive crystal-based VanderLugt Correlator.

However, in the novel technique of the invention, the input scene is put in the read beam and the reference image is put in one of the write beams. Further, both of these beams are made incident on one surface of the photorefractive crystal, while the other write beam is made incident on the opposite surface of the photorefractive crystal.

Once this is done, then the beam ratio is adjusted such that the index grating is erased when the input is stationary. Specifically, the intensity of the read beam is maintained at a value that is at least twice the intensities of the write beams.

The inventors discovered in the course of investigation of a real-time VanderLugt optical correlator using photorefractive GaAs that under different conditions, described below, that the output peak intensity of a matched object may be increased more than two to three times by simply allowing that object to move. This may be useful to those applications in which only the moving object of interest is desired to be identified and tracked.

The new optical correlator is termed herein as a "motion-sensitive optical correlator". Functionally, it is similar to a novelty filter, although instead of a phase conjugate interferometer, a VanderLugt Correlator is employed, consisting of a single photorefractive crystal which does both the correlation and the motion filtering. The operating principle of the motion-sensitive optical correlator of the present invention is thus very different from simply combining an optical novelty filter with an optical correlator.

FIGS. 1*a* and 1*b* illustrate the functionality of the motion-sensitive optical correlator of the present invention. Inside the motion-sensitive optical correlator 10, a tank is chosen as a reference object 12. The actual object 12, here, the tank, is viewed by a camera 14, which provides input to the motion-sensitive optical correlator 10. The output of the motion-sensitive optical correlator 10 is displayed on a CRT monitor 16 and the autocorrelation peak only occurs when the tank 12 is moving (FIG. 1*b*). To remove the weaker signal from the output, thresholding is needed. In this case, thresholding is provided by adjusting the contrast and brightness of the cathode ray tube (CRT) monitor. However, depending on the type of the CRT monitor used, the performance may vary. The performance is very good using black and white CRT monitors to which the inventors have access, whereas it is unsatisfactory using a household color TV. A preliminary experiment is described below and the mechanism behind the motion-sensitive optical correlator is discussed.

The schematic diagram of the motion-sensitive optical correlator 20 is shown in FIG. 2. Not shown in FIG. 2 are a Nd:YAG laser (lasing at 1.06 μm) and some optical components for expanding, collimating, and dividing the laser beam to provide a write beam I1, a read beam I2, and a second write beam I3. The basic configuration is the same as a VanderLugt correlator with a reflection grating; see, e.g., U.S. Pat. No. 5,150,228, issued to Tsuen-Hsi Liu et al and assigned to the same assignee as the present application. Namely, a hologram is generated by write beams I1 and I2 in a photorefractive crystal 22, where write beam I1 contains the Fourier transform of the reference image and write beam I2 is the reference plane wave; the correlator output is generated by reading this hologram with I3, which contains the Fourier transform of the input image. The output beam I4 then contains the correlation function of the reference and input images.

The Fourier transform operation is performed by a Fourier transform lens 24, acting on read beam I3 and write beam I1 after modulation by a liquid crystal TV (LCTV) 26, which acts as a spatial light modulator, and after polarization by a polarizer 28. In one experiment, a test image was employed, which was a circle generated by the frame grabber, which is described more fully below.

To reduce the Bragg angle limitation, the angle between I1 and I3 is chosen to be relatively small (about 2.5 degrees). This is the reason that only one LCTV 26 is used to modulate both I1 and I3. The focal length of the Fourier transform lens 24 is 17.8 cm, and the separation between I1 and I3 is about 0.8 cm. To have a small angle between I1 and I3, beams I1 and I3 are in fact two parts of a single expanded beam with a diameter of about 2.5 cm. The photorefractive crystal 22 used here is a CdTe crystal. The crystal orientation is arranged to enable cross polarization diffraction. This, together with the polarizing beam splitter 30, through which the write beam I1 passes to the Fourier transform lens 24 and through which the output beam I4 is directed to a detector 32, such as a CCD camera, may significantly increase the signal to noise ratio.

In order to produce an input image and a reference image in the respective write beam I1 and the read beam I3, a personal computer 34 was installed with image frame grabbers (not shown). In general, an image frame grabber can take real-time video input, freeze one frame, and digitize it for storing in a disk in the computer 34. In reverse, it can convert the digitized image to a standard analog video signal for driving the liquid crystal TV panel 26 through LCTV driver 36. The reference image is kept fixed in the frame grabber to drive the spatial light modulator, or LCTV, panel 26, and modulates the write beam I1, while the input image, which contains fixed and moving objects at different times, drives the same spatial light modulator panel as the write beam I1 and modulates the read beam While separate spatial light modulator panels 26 could be used, it is convenient to use one spatial light modulator panel, with one half modulating the read beam I3 and the other half modulating the write beam I1.

In the experiment performed by the inventors, the PC 34 generated both the reference image and the input image. In actual usage, however, the PC 34 would generate the reference image and the actual input image 12 would drive the LCTV 26 via camera 14.

The relative intensities of the read and write beams are adjusted by any of the means commonly known in the art. Applicants employed appropriate beam splitters and half-waveplates, such as shown in their U.S. Pat. No. 5,150,228, supra.

In the steady state, the apparatus 20 of the invention behaves like an ordinary optical correlator. However, in the transient state, it behaves quite differently from an ordinary optical correlator. Namely, when the input object 12 is moving, the correlation peak goes up; when the motion stops, the correlation peak goes down again. The ratio of the stronger peak and the weaker peak is about 3. By thresholding the output from the contrast of the CRT 16 and brightness adjustments, the weaker peak can be removed from the output. As a result, the correlation peak occurs only when the input object 12 is moving.

Without subscribing to any particular theory, it appears that the observed phenomenon described above is due to the dynamic erasure property of the photorefractive crystal and the fact that the holographic medium is a thick photorefractive crystal, at least about 0.5 cm. The detailed qualitative theory is given below.

FIG. 3 depicts that portion of the apparatus of FIG. 2 relating to the LCTV 26, polarizer 28, Fourier transform lens 24, and photorefractive crystal 22. FIG. 3*a*, which is an enlargement of the photorefractive crystal 22, shows the beam geometry inside the photorefractive crystal 22 for two positions of input. If there is no photorefractive crystal, these two beams should intersect with the beam bearing the reference image in the same region. However, as will be shown later, when these beams intersect in a refractive medium, the intersections are in different regions. In the steady state, because the input image is in the reading beam I3, it partially erases the grating written by I2 and I1, which bears the reference image. When the input object 12 is moving, the intersection of the Fourier transforms of the input object and the reference object also moves. It follows from this that some of the gratings that previously were not shined on or just weakly shined on by the reading beam are fully shined on now; this is possible, because the Fourier transforms of most images are not a uniform pattern. Now, because these gratings were not erased at all or just weakly erased previously, they are stronger than those that were partially erased previously and thus the correlation peak intensity goes up for a short period of time until the motion of the input object stops and the grating in the new intersection is partially erased again. Because the time needed for erasure to reach equilibrium is finite, the apparent correlation peak intensity should depend on the speed of the matched object.

FIG. 4 shows that when there is a refractive medium covering the focal plane, the focal points vary with the position of the beams. The following equation gives a quantitative calculation of the displacement between two different focal points. This difference is necessary for supporting the theory outlined above.

$$d_1^2 - d_2^2 = d_0^2(n_0^2 - 1)\left(\frac{1}{\cos^2\theta_1} - \frac{1}{\cos^2\theta_2}\right)$$

where $n_0$ is the index of refraction of the holographic medium (i.e., the photorefractive crystal) and d and $\theta$ are distances and angles defined in FIG. 4.

Thus, there has been disclosed a method of detecting and recognizing at least one moving object. It will be readily apparent to those skilled in this art that various changes and modifications of an obvious nature may be made without departing from the spirit and scope of the invention, and all such changes and modifications are considered to fall within the scope of the invention, as defined by the appended claims.

What is claimed is:

1. A method of detecting and recognizing at least one moving object utilizing a VanderLugt correlator, which comprises the steps of (a) forming a read beam and a first write beam, said read beam containing an image of said object;

(b) modulating said read beam and said first write beam by means of a spatial light modulator, said spatial light modulator containing a reference image of said object to be detected;

(c) passing both beams through a Fourier transform lens to generate Fourier transform images of said beams;

(d) causing both beams to intersect with a second write beam in a fast photorefractive crystal to generate an output beam, said second write beam containing a reference plane wave;

(e) maintaining the intensity of said read beam at a higher value than the intensities of said write beams; and (f) supplying said output beam to a means for generating a visual display therefrom, whereby said visual display displays at least one of said moving object and a reduced clutter from stationary background noise.

2. The method of claim 1 wherein both said write beams and said read beam are generated by a common source.

3. The method of claim 1 wherein said read beam has an intensity that is adjusted to be at least twice the intensities of said write beams.

4. The method of claim 1 wherein said spatial light modulator comprises a liquid crystal television.

5. The method of claim 1 wherein a portion of said spatial light modulator is driven by a reference image and another portion of said spatial light modulator is driven by said object image, said reference image modulating said first write beam and said object image modulating said read beam.

6. The method of claim 1 wherein said fast photorefractive crystal is selected from the group consisting of GaAs, InP, and CdTe.

7. The method of claim 1 wherein said photorefractive crystal has a thickness of at least about 0.5 cm.

8. The method of claim 1 wherein a small angle of about 2.5° between said read beam and said first write beam is formed.

9. Apparatus for detecting and recognizing at least one moving object utilizing a VanderLugt correlator, comprising:

(a) means for forming a read beam and a first write beam, said read beam containing an image of said object;

(b) means for modulating said read beam and said first write beam by means of a spatial light modulator, said spatial light modulator containing a reference image of said object to be detected;

(c) means for passing both beams through a Fourier transform lens to generate Fourier transform images of said beams;

(d) means for causing both beams to intersect with a second write beam in a fast photorefractive crystal to generate an output beam, said second write beam containing a reference plane wave;

(e) means for maintaining the intensity of said read beam at a value of at least about twice that of the intensities of said write beams; and (f) means for supplying said output beam to a means for generating a visual display therefrom, whereby said visual display displays at least one of said moving object and a reduced clutter from stationary background noise.

10. The apparatus of claim 9 further including a common source to form both said write beams and said read beam.

11. The apparatus of claim 9 wherein said spatial light modulator comprises a liquid crystal television.

12. The apparatus of claim 9 further including means for driving a portion of said spatial light modulator by a reference image and means for driving another portion of said spatial light modulator by said object image, with means for modulating said first write beam with said reference image and means for modulating said read beam with said object image.

13. The apparatus of claim 9 wherein said fast photorefractive crystal is selected from the group consisting of GaAs, InP, and CdTe.

14. The apparatus of claim 9 wherein said photorefractive crystal has a thickness of at least about 0.5 cm.

15. The apparatus of claim 9 further including means for forming a small angle of about 2.5° between said read beam and said first write beam.

* * * * *